United States Patent [19]

Shiah et al.

[11] Patent Number: 5,610,467
[45] Date of Patent: Mar. 11, 1997

[54] BRUSH HOLDER ASSEMBLY

[75] Inventors: Kyi-Shin Shiah, Northville; Anthony Iverson, Monroe, both of Mich.

[73] Assignee: United Technologies Motor Systems, Inc., Columbus, Miss.

[21] Appl. No.: 496,994

[22] Filed: Jun. 30, 1995

[51] Int. Cl.$^6$ ............................ H01R 4/10; H02K 11/02
[52] U.S. Cl. ........................ 310/239; 310/249; 310/220
[58] Field of Search ................................. 310/239, 249, 310/220, 221, 191, 192; 336/212, 221

[56] References Cited

U.S. PATENT DOCUMENTS

| | | | |
|---|---|---|---|
| 2,199,532 | 5/1940 | Weeks . | |
| 3,304,452 | 2/1967 | Hurrell et al. . | |
| 3,710,159 | 1/1973 | Dupuis et al. | 310/239 |
| 3,750,069 | 7/1973 | Renskers | 336/83 |
| 4,746,828 | 5/1988 | Nado et al. | 310/90 |
| 5,159,222 | 10/1992 | Southall | 310/239 |
| 5,196,750 | 3/1993 | Strobl | 310/239 |
| 5,208,499 | 5/1993 | Barber et al. | 310/51 |
| 5,221,130 | 6/1993 | Satoh et al. | 310/239 |
| 5,235,230 | 8/1993 | Yuhi et al. | 310/71 |

*Primary Examiner*—Steven L. Stephan
*Assistant Examiner*—Burton S. Mullins
*Attorney, Agent, or Firm*—Ozer M. N. Teitelbaum

[57] ABSTRACT

The present invention teaches an improved brush holder assembly. The holder has a first terminal wire and comprises a support plate and a tower attached thereto for securing the first terminal wire. The tower comprises a body and an end. The body comprises an interior passageway with a number of ribs for securably positioning the first terminal wire within the body and a groove for securing the first terminal wire within the tower. The tower's end functionally crimps the first terminal wire and has a plurality of support members for securably positioning the crimped first terminal wire within a mouth of the end. A coil spring forming an inductor is also incorporated for mechanically biasing a brush and for filtering out electromagnetic interference (EMI).

20 Claims, 2 Drawing Sheets

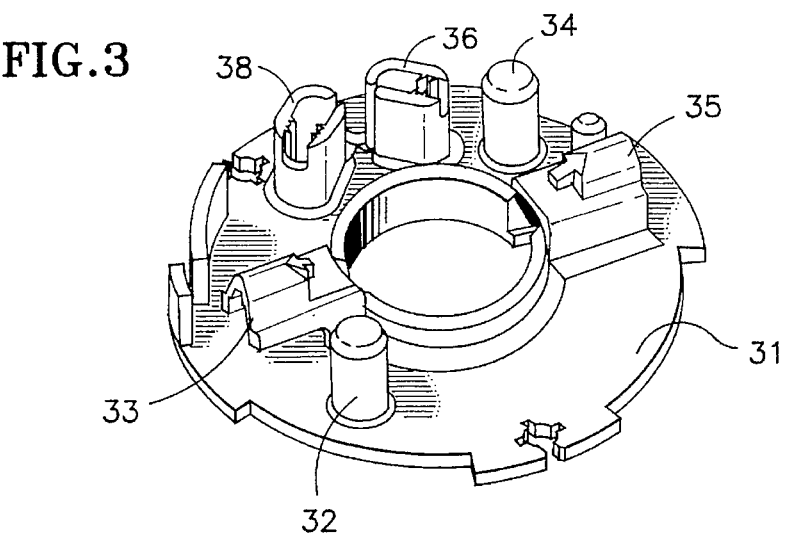
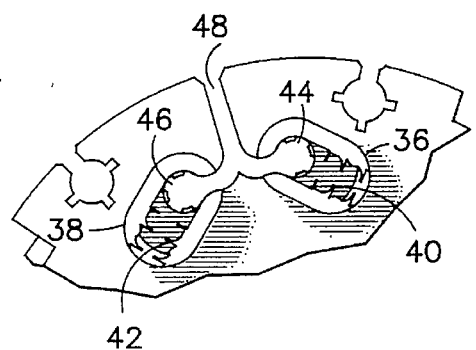
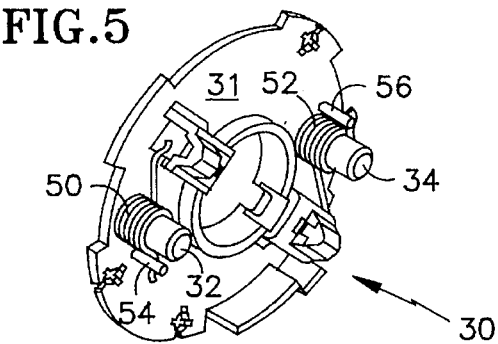
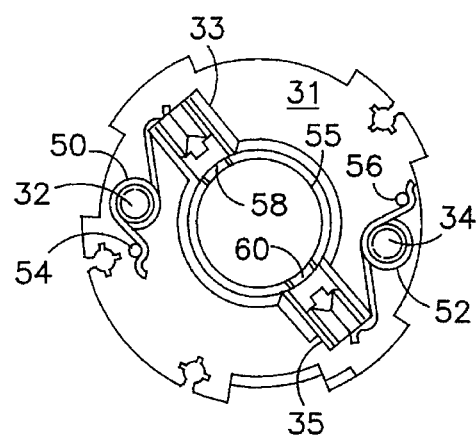

BRUSH HOLDER ASSEMBLY

FIELD OF THE INVENTION

The present invention relates to electric motors, and more particularly to an improved brush holder assembly.

BACKGROUND OF THE INVENTION

Brush holders are known in the electric motor art. Typically comprising a pair of brush boxes for enabling a first and second brush joined with a first and second terminal wire to make contact with a commutator, prior holder designs provide support for the aforementioned electric motor components. During operation of an electric motor, current passes from the commutator through the brushes and terminal wires, and vice versa.

Several problems have arisen with regards to the known electric motor designs, and more specifically, known brush holder configurations. First, in assembling a brush holder, traditionally, each terminal wire is routed through the holder's support plate and then welded with its respective brush. However, by this arrangement, the durability of the brush-terminal wire joints have become an issue.

This first shortcoming may be best viewed in FIG. 1, where a brush terminal wire combination 10 is shown. Combination 10 comprises a cable 12 having an exposed wire 14. Moreover, combination 10 comprises a shunt 20, coupled with brush 22, which is crimped to an eyelet 21. Combination 10 is also attached to brush plate 31 by a rivet 17. Exposed wire 14 is joined to rivet 17 by way of a solder joint 18 to provide electrical contact between brush 22 and cable 12. While solder joint 18 electrically couples brush 22 with exposed wire 14, it also provides a poor means for physically securing both elements.

Furthermore, electric motors are also sources of electromagnetic interference ("EMI"). It is well known that EMI negatively affects the performance of electronic systems both proximate with an EMI source, as well as coupled to a power supply common with an EMI source. EMI is caused by the release of energy from an intermittent contact of brushes with the slotted outer surface of each commutator directly. As a result, EMI is transmitted through each terminal wire and radiated by the armature coils and the terminal wires. The electric motor, thus, acts essentially as an EMI source and transmitter.

In view of the above limitations, there presently exists a need for a brush holder which provides greater support and security for the connection electrically coupling the brush with the terminal wire. Moreover, a demand remains for a brush holder which provides for reduced EMI emissions.

DISCLOSURE OF THE INVENTION

The primary advantage of the present invention is to overcome the limitations of the prior art.

Another advantage of the present invention is to provide a brush holder for providing greater support and security for the connection electrically coupling the brush with the terminal wire.

Still another advantage of the present invention is to provide a brush holder for simplifying manufacturing, reduce assembly costs and packaging, while improving reliability and quality.

Yet still another advantage of the present invention is to provide a brush holder for reducing electromagnetic interference ("EMI") emissions.

In order to achieve the advantages of the present invention, an improved brush holder assembly is disclosed. The holder has a first terminal wire and comprises a support plate and a tower attached thereto for securing the first terminal wire. The tower comprises a body and an end. The body comprises an interior passageway with a number of ribs for securably positioning the first terminal wire within the body and a groove for securing the first terminal wire within the tower. The ribs function to prevent the terminal wire from slipping once in position by deforming the wire's insulation. The tower's end functionally crimps the first terminal wire and has a plurality of support members for securably positioning the crimped first terminal wire within a mouth of the end. A spring is also incorporated for biasing a brush.

In the preferred embodiment of the present invention, the brush spring is on a post attached with the support plate and comprises a coil shape for forming an inductor to substantially filter out electromagnetic interference from the electric motor.

These and other advantages and objects will become apparent to those skilled in the art from the following detailed description read in conjunction with the appended claims and the drawings attached hereto.

BRIEF DESCRIPTION OF THE DRAWINGS

The present invention will be better understood from reading the following description of non-limitative embodiments, with reference to the attached drawings, wherein below:

FIG. 3 illustrates a perspective view of the preferred embodiment of the present invention;

FIG. 4 illustrates a portion of a planar view of the preferred embodiment of the present invention;

FIG. 5 illustrates a second cross sectional view of the preferred embodiment of the present invention;

FIG. 6 illustrates a planar view of the preferred embodiment of the present invention.

It should be emphasized that the drawings of the instant application are not to scale but are merely schematic representations and are not intended to portray the specific parameters or the structural details of the invention, which can be determined by one of skill in the art by examination of the information herein.

DETAILED DESCRIPTION OF THE INVENTION

Figure 2:
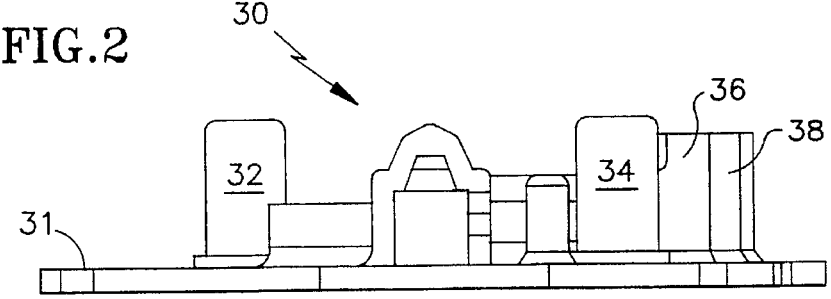
FIG. 2 illustrates a first cross sectional view of the preferred embodiment of the present invention.

Referring to FIG. 2, a cross sectional view highlighting a brush holder 30 of the preferred embodiment of the present invention is illustrated. Brush holder 30 comprises a support plate 31 from which a first and second post 32 and 34. Furthermore, brush holder 30 additionally comprises a first and second tower, 36 and 38, for securing the first and second terminal wires. First and second posts, 32 and 34, as well as first and second towers, 36 and 38 are each attached to support plate 31. In the preferred embodiment of the present invention, support plate 31, first and second posts, 32 and 34, and first and second towers, 36 and 38 comprise a plastic material and are formed by injection molding.

Referring to FIG. 3, a first perspective view of brush holder 30 of the preferred embodiment is shown. Here, it may be seen that brush holder 30 further comprises a first and second brush box, 33 and 35, for storing a first and second brush. Moreover, first and second tower, 36 and 38, comprise a body and an end having a mouth for crimping the end of the respective terminal wire. By this arrangement, the end of the insulated portion of terminal wire is securably fastened within the tower to increase the support and security of the terminal wire. In the preferred embodiment of the present invention, the end comprises a plurality of support members to further securably position the crimped terminal within the mouth.

Referring to FIG. 4, a portion of a planar view of the preferred embodiment of the present invention is depicted to further detail the body of towers, 36 and 38. The bodies of first and second towers 36 and 38 each comprise an interior passageway, 36 or 38, respectively, and an opening, 44 and 46, respectively. Each interior passageway comprises a number of ribs, 40 or 42 for securably positioning the respective terminal wire within the body. Further, each opening, 44 or 46, functionally secures the respective terminal wire within its respective body by employing a multiplicity of support members.

Figure 1:
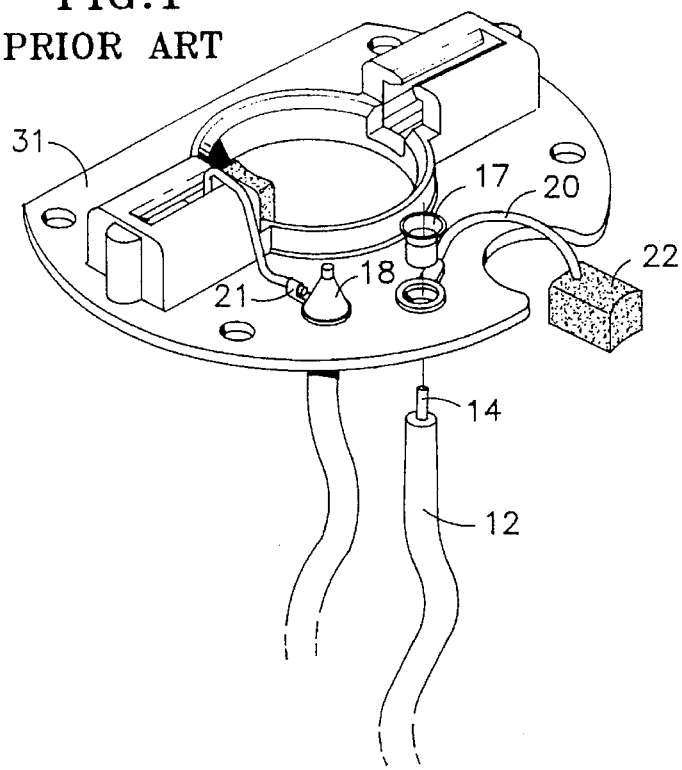
FIG. 1 illustrates a known wire configuration and a known brush holder assembly.

It should be noted that for simplified manufacturing, it is preferred that the cable or terminal wire 12 of FIG. 1 be fixably attached with the brush 22 by means of the shunt 20 prior to positioning the combination within brush holder. By so doing, the reliability of the overall electric motor is improved, as the welding or soldering step is performed prior to insertion, thereby reducing the exposure of the motor's components to unnecessary heat. Welding is preferred because it provides a faster process step and simplifies manufacturing. Pathway 48 is incorporated within the support plate 31 to facilitate simple installation of both the terminal-wire-brush-shunt combinations with their respective brush holders. In a further embodiment of the present invention, the openings of each respective tower comprises a narrow slot to adaptably receive a terminal-wire-brush-shunt combination.

Referring to FIGS. 5 and 6, a second and third planar view of the preferred embodiment of the present invention are illustrated. Here, it may be seen that brush holder 30 employs first and second posts, 32 and 34, in combination with a first and second spring, 50 and 52, respectively, as a means for reducing the effects of electromagnetic interference ("EMI").

As best viewed in FIG. 6, brushes 58 and 60 are biased with commutator 55 to enable an electric current to conduct. This biasing is preferably realized by means of a first and a second spring, 50 and 52 for biasing brushes 58 and 60, respectively. A first and a second support stop, 54 and 56, are incorporated for providing a support means for the relevant spring.

With respect to FIG. 5, by designing the spring in a coil shape and positioning it on its respective post, an inductor may be formed. The spring preferably comprises a relatively high level of conductivity to reduce electrical loss and heat. To prevent shorts generally, as well as a shortage between adjacent turns in the inductor spring arrangement, the springs may be coated with an insulative material such as polyimide. However, other insulative materials may become apparent to one of ordinary skill, particularly with respect to the specific requirements of an application, upon understanding the present invention.

The resultant inductor created provides a means for substantially filtering out EMI generated by the electric motor. To facilitate a particular inductance value, the relevant post may comprise a ferromagnetic material, acting as an inductance core, to increase the inductance. Similarly, the post may comprise a non-ferromagnetic material, acting as an inductance core, to decrease the inductance. The preferred ferromagnetic material comprises iron, while a preferred non-ferromagnetic material comprises aluminum or plastic.

Figure 7:
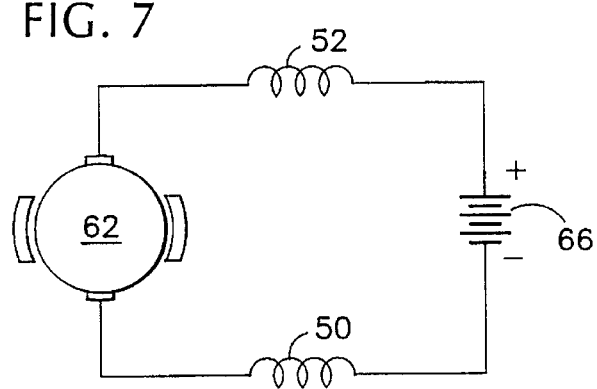
FIG. 7 illustrates a circuit realization of the second feature of the preferred embodiment of the present invention.

Referring to FIG. 7, a circuit realization of FIGS. 5 and 6 is illustrated. Here, springs 50 and 52 are symbolically represented as a first and second inductor, 50 and 52, respectively. As shown, inductor springs 50 and 52 are electrically coupled in series with a power source 66 and an electric motor 62 for reducing electromagnetic interference ("EMI").

While the particular invention has been described with reference to illustrative embodiments, this description is not meant to be construed in a limiting sense. It is understood that although the present invention has been described in a preferred embodiment, various modifications of the illustrative embodiments, as well as additional embodiments of the invention, will be apparent to persons skilled in the art upon reference to this description without departing from the spirit of the invention, as recited in the claims appended hereto. Thus, while the brush holder of the present invention is described in conjunction with an electric motor, it should be apparent to one of ordinary skill in the art that, upon understanding the instant disclosure, of the invention's applicability in the electric generator art. It is therefore contemplated that the appended claims will cover any such modifications or embodiments as fall within the true scope of the invention.

All of the U.S. Patents cited herein are hereby incorporated by reference as if set forth in their entirety.

What is claimed is:

1. A brush holder for coupling a brush of a motor and a first terminal wire, said brush holder comprising:
   a support plate;
   a tower for securing the first terminal wire within said support plate to provide strain relief, said tower formed with said support plate and comprising:
   a body, comprising:
   a number of ribs for securably positioning the first terminal wire within said body;
   a multiplicity of support members for securing the first terminal wire within said opening; and
   an end for crimping the first terminal wire, said end having a plurality of support members for securably positioning said crimped first terminal wire within a mouth of said end.

2. The brush holder of claim 1, further comprising a spring for biasing the brush, said spring being positioned on a post formed with said support plate, said spring comprising a coil shape for forming an inductor to substantially filter out electromagnetic interference from the motor.

3. The brush holder of claim 2, wherein said spring conducts current to and from the motor.

4. The brush holder of claim 2, wherein said post comprises at least one of ferromagnetic material for increasing the inductance of said inductor and a non-ferromagnetic material for decreasing the inductance of said inductor.

5. The brush holder in claim 4, wherein said ferromagnetic material comprises iron.

6. The brush holder of claim 4, wherein said non-ferromagnetic material comprises at least one of aluminum and plastic.

7. The brush holder of claim 2, wherein the first terminal wire is coupled with the brush by means of a coil shaped spring.

8. The brush holder of claim 2, wherein at least one of said support plate, said post, and said tower comprises a plastic material formed by injection molding.

9. The brush holder of claim 1, wherein said body further comprises a pathway for facilitating access of said first terminal wire with said tower.

10. A brush holder for an electric motor having a commutator, a first and second brush and a first and second terminal wire, said brush holder comprising:

support plate;

a first spring for enabling the first brush to be electrically and mechanically biased with the commutator, and for filtering out eletromagnetic interference, said first spring positioned on a first post formed with said support plate, and a second spring enabling the second brush to be electrically and mechanically biased with commutator, said second spring positioned on a second post formed with said support plate; and a first and second tower for respectively securing the first and second terminal wires to provide strain relief, said towers attached with said support plate, each tower of said towers comprising:

a body for securely positioning the respective terminal wire, said body comprising:

a number of ribs for securably positioning the respective terminal wire within said body;

a multiplicity of support members for securing the respective terminal wire within said body; and a first end for crimping the first terminal wire and a second end for crimping the second wire, said first end having a first plurality of support members for securably positioning said crimped first terminal wire within a first mouth of said first end, and said second end having a second plurality of support members for securably positioning said crimped second terminal wire within a second mouth of said second end.

11. The brush holder of claim 10, wherein at least one of said first and second posts comprises a ferromagnetic material for increasing the inductance of the respective inductor associated with said at least one of said first and second posts.

12. The brush holder of claim 11, wherein said ferromagnetic material comprises iron.

13. The brush holder of claim 10, wherein at least one of said first and second posts comprises a non-ferromagnetic material for decreasing the inductance of the respective inductor associated with said at least one of said first and second posts.

14. The brush holder of claim 13, wherein said non-ferromagnetic material comprises at least one of aluminum and plastic.

15. The brush holder of claim 10, wherein at least one of said first and second springs conduct current to and from the electric motor.

16. The brush holder of claim 11, wherein at least one of said support plate, said first and second posts, and said first and second towers comprises a plastic material formed by injection molding.

17. The brush holder of claim 10, wherein at least one of said bodies further comprises a pathway for facilitating access of the respective terminal wire with said respective tower.

18. An electric motor comprising:

a commutator for commutating a current between a first and a second power terminal wire each having an insulation;

a first and a second brush for contacting the commutator; and a brush holder for holding said brushes in position relative to said commutator, said brush holder comprising:

a support plate for supporting said commutator and said brushes;

a first and a second spring for biasing said first and second brushes, respectively, against said commutator, and for filtering out electromagnetic interference, said first and second springs formed on a first and a second post, each of said first and second springs comprising a coil shape for forming a first and a second inductor, respectively, to substantially filter out electromagnetic interference created by the operation of the electric motor;

a first and a second tower for securing each of said first and second power terminal wires with said support plate to provide strain relief, each of said towers comprising:

a body, said body comprising:

a number of ribs for securably positioning said respective power terminal wire within said body by deforming said insulation of said respective power terminal wire;

an enclosed pathway for facilitating access of said first and second terminal wires with said first and second towers respectively; and a multiplicity of support members for securing the respective power terminal wire within said body; and an end for crimping said respective power terminal wire, said end having a plurality of support members for securably positioning said respective crimped power terminal wire within a mouth of said end.

19. The brush holder of claim 18, wherein at least one of said first and second posts comprises at least one of a ferromagnetic material for increasing the inductance of the respective inductor associated with said at least one of said first and second posts and a non-ferromagnetic material for decreasing the inductance of the respective inductor associated with said at least one of said first and second posts.

20. The brush holder of claim 18, wherein at least one of said first and second springs conducts current to and from the electric motor.

* * * * *